(12) United States Patent
Dariotis et al.

(10) Patent No.: US 6,377,727 B1
(45) Date of Patent: Apr. 23, 2002

(54) PASSIVE TEMPERATURE-COMPENSATING PACKAGE FOR FIBER BRAGG GRATING DEVICES

(75) Inventors: Stavros Dariotis, Attleboro; Colm V. Cryan, Arlington; Margaret Manty, Whitinsville; Adrian P. Pryshlack, Milton, all of MA (US)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 09/574,266

(22) Filed: May 19, 2000

Related U.S. Application Data (60) Provisional application No. 60/135,761, filed on May 25, 1999.

(51) Int. Cl.$^7$ .............................................. G02B 61/34
(52) U.S. Cl. ............................... 385/37; 385/96; 385/97
(58) Field of Search ............................. 385/37, 96, 99, 385/134, 97, 98

(56) References Cited

U.S. PATENT DOCUMENTS

| | | |
|---|---|---|
| 5,042,898 A | 8/1991 | Morey et al. .................. 385/37 |
| 5,109,479 A | 4/1992 | Williams |
| 5,613,013 A | 3/1997 | Schuette |
| 5,694,503 A | 12/1997 | Fleming et al. ................ 385/37 |
| 5,793,372 A | 8/1998 | Binns et al. |
| 5,841,920 A | 11/1998 | Lemaire et al. ................ 385/37 |
| 5,844,667 A | 12/1998 | Maron ........................ 356/35.5 |
| 5,974,209 A * | 10/1999 | Cho et al. ...................... 385/37 |
| 5,974,212 A * | 10/1999 | Saeki ........................... 385/37 |
| 5,999,671 A | 12/1999 | Jin et al. ....................... 385/37 |
| 6,301,410 B1 * | 10/2001 | Carberry et al. ............. 385/37 |
| 6,317,538 B1 * | 11/2001 | Shigehara et al. ........... 385/37 |

* cited by examiner

Primary Examiner—Tulsidas Patel
Assistant Examiner—Phuong K T Dinh
(74) Attorney, Agent, or Firm—Weingarten, Schurgin, Gagnebin & Lebovici LLP (57) ABSTRACT

A passive temperature compensating package for a fiber Bragg grating device in which the fiber Bragg grating is written to the fiber prior to the temperature compensation being set. As the temperature of the package increases the fiber is de-stressed and at the desired proper resonant frequency, the fiber containing the fiber Bragg grating is secured to the package. As the package cools and expands, the fiber is pre-stressed and maintains the desired resonant frequency.

25 Claims, 3 Drawing Sheets

PASSIVE TEMPERATURE-COMPENSATING PACKAGE FOR FIBER BRAGG GRATING DEVICES

CROSS REFERENCE TO RELATED APPLICATIONS

Priority is claimed under 35 USC § 119 (e) of the Provisional Patent Application No. 60/135,761, filed on May 25, 1999, entitled: PASSIVE TEMPERATURE-COMPENSATING PACKAGE FOR FIBER BRAGG GRATING DEVICES

STATEMENT REGARDING FEDERALLY SPONSORED RESEARCH OR DEVELOPMENT

N/A

BACKGROUND OF THE INVENTION

The placement of an optical filter in an optical fiber device to reflect a particular wavelength is well known. Single fibers and multi-fiber couplers all may include an optical filter that is of the fiber Bragg grating (FBG) type. A fiber Bragg grating includes a plurality of grating elements formed by intense beams of UV light that are transverse to the longitudinal axis of the optical fiber. The UV light induces a permanent change in the index of refraction in each grating region within the optical fiber.

Figure 1:
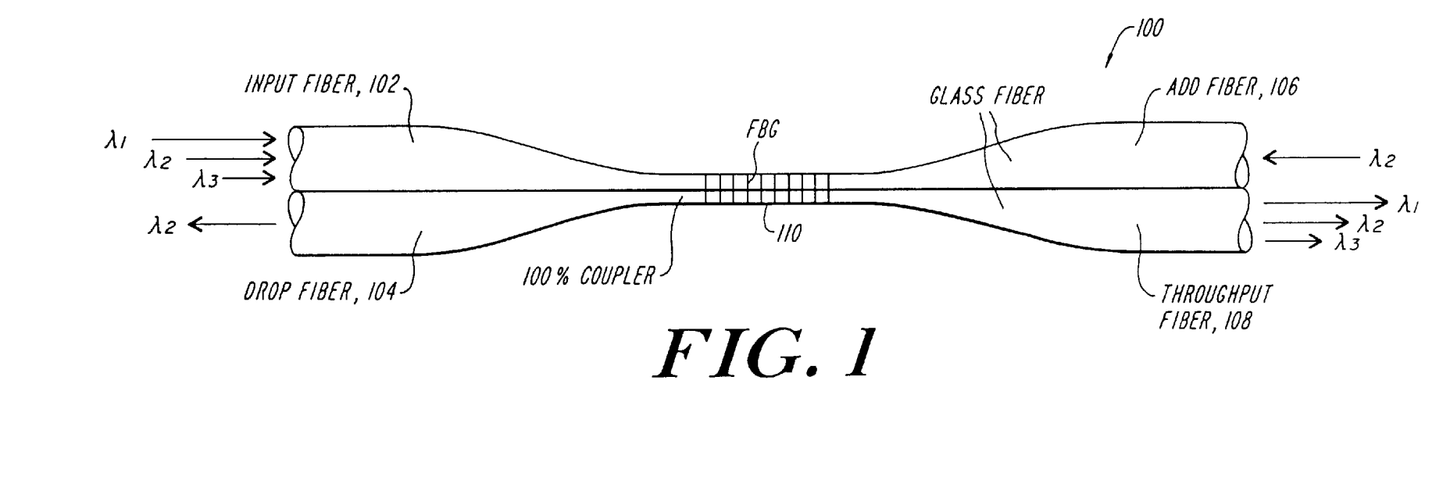
FIG. 1 is an isometric view of a add/drop coupler incorporating a fiber Bragg device.
Figure 2:
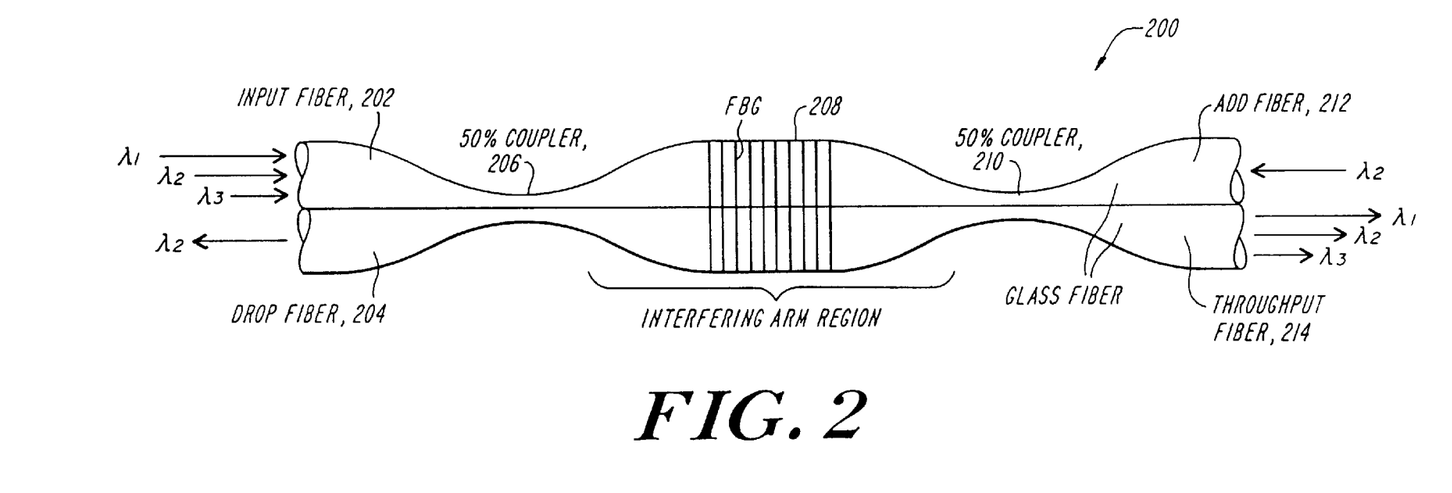
FIG. 2 is an isometric view of a Mach-Zehnder Interferometer add/drop coupler incorporating a fiber Bragg device.

Two examples of fiber optic devices incorporating a FBG are shown in FIGS. 1 and 2. FIG. 1 shows a fused/tapered add/drop multiplexer (ADM) 100. The ADM 100 includes an input fiber 102 in which at least one wavelength of light is input into the coupler. The FBG is written in the 100% coupling grating region 110. The wavelength selectively reflected by the FBG (the resonant frequency) is reflected and exits out of the drop fiber 104. An add fiber 106 may be used to couple a selected wavelength into the output fiber 108. The output fiber 108 will provide an output to the wavelengths input from the input fiber 102 and not reflected by the FBG and a wavelength coupled into the coupler from add fiber 106.

FIG. 2 illustrates a Mach-Zehnder Interferometer add/drop multiplexer (MZI-ADM) 200. The MZI-ADM 200 includes as inputs to the coupler input fiber 202 and add fiber 212, a first 50% coupler region 206, an interfering arm region 208 in which the FBG is written, a second 50% coupler 210, and as outputs a drop fiber 204 and an output fiber 214. Due to the interferometric nature of the device, the position of each component is extremely important. As such, there can be little or no strain placed on the first and second 50% coupler regions.

The particular wavelength that is reflected by the FBG is a function of the index of refraction of the optical fiber, the spacing of the grating elements and the induced change in the index of refraction of the grating elements. The index of refraction of an optical fiber, the grating elements, and the spacing of the grating elements are dependent upon the temperature of the grating region and the strain, if any, on the grating region. Therefore, once a FEG has been written into the grating region of an optical fiber, any change in the temperature or strain on the grating region may change the resonant frequency of the FBG.

One method for compensating an FBG for a change in temperature is to pre-strain the grating region of the optical fiber containing an FBG. In this way any increase or decrease in temperature may be compensated for by reducing or increasing the strain on the grating region containing the FBG respectively.

Although it is well known to pre-strain the region of the grating region of an optical fiber containing the FBG to compensate for a change in temperature, previous attempts have not proved adequate. Among the problems encountered with the previous attempts are that only single fibers could be compensated and that multiple fibers could not be compensated individually. Another problem besides being able to compensate only a single fiber is the inability to compensate a coupler such as a MZI-ADM due to the need to account for strain sensitivity of the couplers that need to remain stress free. Another problem with the previous attempts is that the FBG must be written prior to installation in the compensation apparatus. This is particularly a problem when compensating mutli-fiber couplers such as an ADM or a MZI-ADM because the FBG region can not be twisted or mishandled during installation. Since many of the previous attempts at temperature compensation have included load tensioning devices, such as screws and nuts that when applied to the fiber itself, increases the risk of twisting and damaging the FBG. Still another problem with the previous methods of temperature compensation is that in some methods the fiber region containing the FBG had to be in contact with the compensating member. Since the optical field in the waist or taper region of an add/drop multiplexer or Mach-Zehnder Interferometer is exposed, contact with another surface would cause an increase in the attenuation of the optical signal.

What is needed in the art therefore is a temperature compensation apparatus for a fiber region containing an FBG that is able to independently compensate multiple fibers, compensate a Mach-Zehnder Interferometer, compensate an add/drop multiplexer, does not apply torque or twist to the fiber region, does not require the optical field in the waist or taper region of a coupler to be in contact with any surface, and allows the FBG to be written to the selected fiber region after installation and assembly of the temperature compensation apparatus.

BRIEF SUMMARY OF THE INVENTION

The present invention provides for a passive temperature-compensating package for fiber Bragg grating devices that protects the fiber optic device from handling, does not apply a mechanical torque to the fiber Bragg device, and allows the fiber Bragg grating to be written after installation in the package. An apparatus for temperature compensation of a fiber optic device, the apparatus comprises a housing member that has a longitudinal channel defined therein by first and second side walls. The first and second side walls each have a first height and a bottom surface. In addition, the housing has a first coefficient of thermal expansion. There is a longitudinal coupling region within the longitudinal channel in which the first and second side walls have a second height and the bottom surface has an aperture defined therethrough. The aperture allows optical communication between the coupling region and an external light source. The first and second thermal compensation members are sized and dimensioned to fit within the longitudinal channel, and are affixed within the longitudinal channel on opposite sides of the longitudinal coupling region. The first and second thermal compensation members each have a top surface that has a first length and a bottom surface that has a second length. The top surface includes a first region proximal to the coupling region, and a second region distal to the coupling region. The first region includes a plurality of spaced apart platforms, where each of the plurality of platforms is substantially the same height. The first and second thermal compensation members have a second coefficient of thermal expansion that is greater than the first coefficient of thermal expansion. A fiber optic device that includes a grating region that is disposed within the longitudinal coupling region, and is maintained at a predetermined level of tension. The grating region is maintained at this level of tension by attaching the fiber optic device being at opposite ends, where each end is affixed to one of the plurality of platforms in the first region of the first and second temperature compensation members respectively. Thus, as the temperature within the coupling region increases, the first and second temperature compensation members expand toward one another thereby reducing the level of tension within the grating region.

In another embodiment, an apparatus for temperature compensation of a fiber optic device, the apparatus comprises, a housing member having a longitudinal channel defined therein by first and second side walls. The first and second walls each have a first height and a bottom surface, and a first coefficient of thermal expansion. A longitudinal coupling region is disposed within the longitudinal channel, and within the coupling region the first and second side walls have a second height, and the bottom surface has an aperture defined therethrough. The aperture allows optical communication to exist between the coupling region and an external light source. The first and second thermal compensation members are sized and dimensioned to fit within the longitudinal channel, and are affixed within it on opposite sides of the longitudinal coupling region. The first thermal compensation member has a top surface having a first length and a bottom surface having a second length, and a first region proximal to the coupling region, and a second region distal to the coupling region. The first region includes a plurality of spaced apart platforms, and each of the plurality of platforms being substantially the same height. The first thermal compensation member has a second coefficient of thermal expansion that is greater than the first coefficient of thermal expansion. The second thermal compensation member has a top surface and a bottom surface. The top surface includes a first region proximal to the coupling region, and a second region distal to the coupling region. The first region includes a plurality of spaced apart platforms, and each of the plurality of platforms are substantially the same height as one another. The second thermal compensation member has a third coefficient of thermal expansion that is less than the second coefficient of thermal expansion. A fiber optic device containing a grating region that is disposed in the longitudinal coupling region, and the grating region is maintained at a predetermined level of tension. The grating region is maintained at this predetermined level of tension by attaching the fiber optic device at opposite ends, to one of the plurality of platforms in the first region of the first and second temperature compensation members respectively. Thus, as the temperature within the coupling region increases, the first temperature compensation members expands toward the second thermal compensation member thereby reducing the level of tension within the grating region.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

Figure 3:
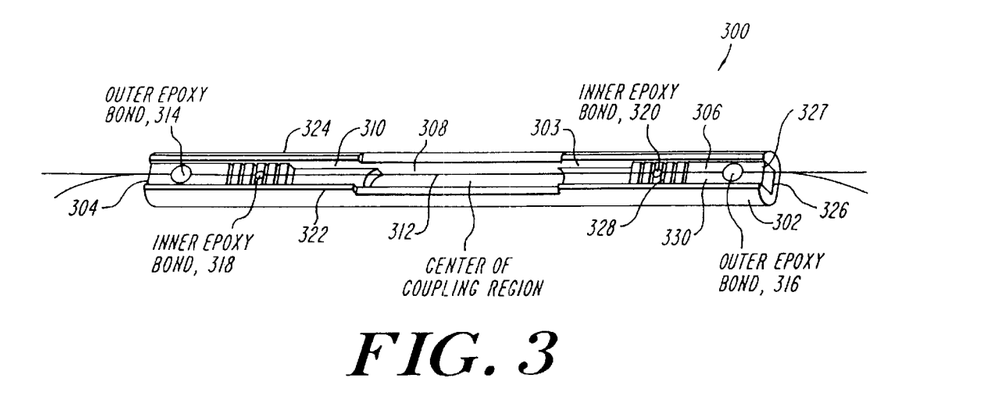
FIG. 3 is a plan view of one embodiment of the present invention.
Figure 4:
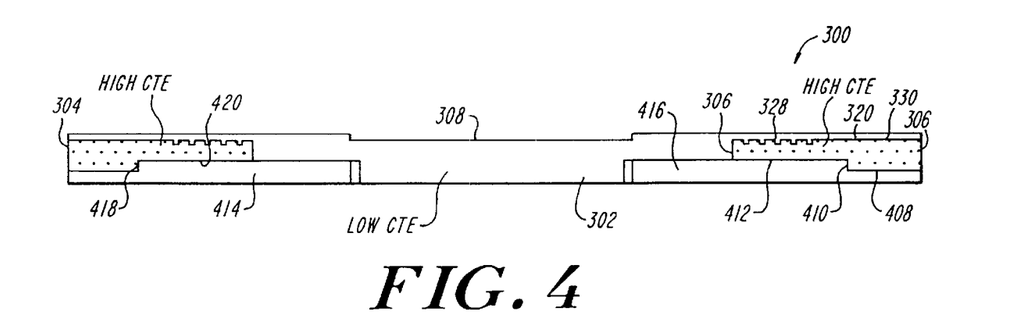
FIG. 4 is a side view of the embodiment of the present inventions shown in FIG.3.

FIGS. 3 and 4 illustrates one embodiment of the passive temperature compensation package for a fiber Bragg grating (FBG) device 300. As will be discussed in more detail below, the major components of the passive temperature compensation package for FBG devices includes a housing 302 having a longitudinal channel 303, first and second temperature compensation members 304 and 306 affixed within the longitudinal channel 303, coupling region 308, and an aperture through the bottom surface of the longitudinal channel 303 disposed within the coupling region. A fiber optic device 310 having a grating region 312 that is disposed within the coupling region 308. Each end of the fiber optic device has a pair of outer attachment points 314, 316 and a pair of inner attachment point 318 and 320. The grating region of the fiber optic device is maintained at a predetermined tension level such that as the temperature increases, the first and second thermal compensation members will expand toward one another and reduce the level of tension on the grating region. This detensioning of the grating region will offset the increase in temperature resulting in stable FBG characteristics.

Housing 302 is composed of a material that has a low coefficient of thermal expansion (CTE) so that there is little variation in the length, width, or height of the housing member 302 due to changes in temperature. Housing member 302 includes a longitudinal channel 303. In one preferred embodiment, the channel is U-shaped and is defined by first and second walls 322 and 324 and bottom surface 326. First and second walls 322 and 324 have a first height defining the height of the channel 303. In one embodiment, the housing member 302 may be constructed from quartz or Invar. In one embodiment, the housing is 3 cm long and 2.5 mm wide.

A coupling region 308 is defined along a portion of the longitudinal channel 303 and within the coupling region 308, the first and second walls 322 and 324 have a second height. In one embodiment, the second height is less than the first height. In one preferred embodiment, the first and second walls are brought to within 5–60 $\mu$m above the grating region of the fiber optic device 310 to allow the FBG to be written. In one embodiment, the difference in height between the first and second height is 2.1 mm.

In addition, the coupling region includes a window or aperture (not shown) in the bottom surface of the channel 303. The window or aperture is to allow optical communication from an external UV light source to the coupling region 308 so as to write an FBG to the grating region of the optical fiber. If the housing member 302 is constructed from quartz, then no additional window or aperture is needed because quartz is transparent at the UV light frequencies used to write FBGs in optical fibers. If the housing member 302 is constructed from Invar or other opaque material, then a window or aperture is required to be provided. In one embodiment, the aperture is 1 cm in length.

In the embodiment shown in FIGS. 3 and 4, the first and second thermal compensation members 304 and 306 are made from material having a high coefficient of thermal expansion such as high expansion glass or steel. FIG. 3 illustrates one embodiment of the thermal compensation member 306 and 304. The thermal compensation members are sized and dimensioned to fit within the longitudinal channel 303. The first and second thermal compensation members include a top surface 327 having a first region 328 and a second region 330. The first region 328 includes a plurality of platforms spaced apart from one another. In one preferred embodiment, each of the platforms are substantially the same height. In one preferred embodiment, the top surface 320 of each of the plurality of platforms is less than the first height of the first and second walls defining the longitudinal channel. This prevents the fiber optic device from being handled once it is installed on the package. In another embodiment there are 5 platforms having a height of 15 mm with a spacing of 15 mm between each platform The plurality of platforms perform a variety of functions in the present invention. The space between each platform helps to control the wicking of the epoxy or other bonding agent along the fiber-surface interface. The plurality of platforms also provides for the accurate positioning of the inner epoxy bond at the predetermined length.

In the embodiment illustrated in FIGS. 3 and 4, the temperature compensation member includes a step shape having a bottom surface 408, a face surface 410 and a step surface 412, wherein the top surface 320 has a longer length than the bottom surface 408. In this embodiment, a pair of step-shaped platform 414, 416 having a face surface 418 and an upper surface 420 that are complimentary to the step shape of the temperature compensation member are disposed within the longitudinal channel 303 on opposite sides of the coupling region 308. In this embodiment, shown in FIG. 4 the face surface 410 of temperature compensation members 304, 306 abuts against the face surface 418 of the platforms 414 and 416 respectively. Step surface 412 is adjacent to and juxtaposed with upper surface 420. In one embodiment, the thermal compensation members 304 and 306 may be affixed within channel 303 along the bottom surface of the longitudinal channel 303 using an epoxy or other bonding agent between the bottom surface of the longitudinal channel and the bottom surface 412 of the temperature compensation members 304, 306. In one embodiment, an epoxy or other suitable bonding agent is used. A suitable epoxy or bonding agent as used herein would have long term stability, and the ability to withstand a high temperature and high humidity environment. In another embodiment, a solder bond is used.

A fiber optic device 310 is shown in FIG. 3 being positioned for use with the present invention. Fiber optic device 310 can be a single fiber, multiple fibers, or a fused/tapered add/drop multiplexer (ADM). In one embodiment, fiber optic device 310 has not yet had a FBG written to it. As will be explained in greater detail below, only after the fiber optic device is installed and prior to the temperature adjustment is the FBG written to the fiber.

The fiber optic device 310 is disposed across the top surfaces of the first and second thermal compensation members 304 and 306 such that the grating region 312 of the fiber is disposed within the coupling region 308. The fiber optic device 310 is attached to the second region 330 of each thermal compensation member 304 and 306 using an epoxy or other bonding agent. In one preferred embodiment, these attachment points should preferably be well outside the coupling region 308. After attachment, the FBG is written to the fiber using intense UV light and any well known method of a fabrication such as phase masks, interference holograms, or interfering laser beams. Next, the package is heated to a temperature that is at least 20° C. higher than the operating temperature of the device. This allows the thermal compensation members to expand into the coupling region to de-tension the device. Because the FBG is written prior to the heating of the package, as the temperature is increased the resonant frequency of the FBG is checked. When the resonant frequency is achieved the inner attachments are made to the appropriate one of each of the two plurality of platforms on each of the thermal compensation members 304, 306. In this way, the resonant frequency and the temperature at which the fiber optic device is packaged at are coupled together and in the proper temperature compensating relationship. The inner bonds may be made with an epoxy or other suitable bonding agent. The package is then allowed to cool. The inner attachment points are used, therefore, to pre-stress the fiber optic device to a predetermined tension level, that is necessary to thermally compensate the FBG's.

Multiple fiber optic devices may be thermally compensated using a single package embodying the present invention. Multiple optical fiber devices can be attached one at a time with the outer attachments, and for each fiber optic device, the package is heated to the desired temperature, and each fiber optic device is secured on the appropriate one of the platforms of each of the two thermal compensation members. Each fiber optic device therefore is individually calibrated. As each subsequent device is calibrated, the resonant frequency of the preceding devices should not change during the temperature cycling.

Figure 6:
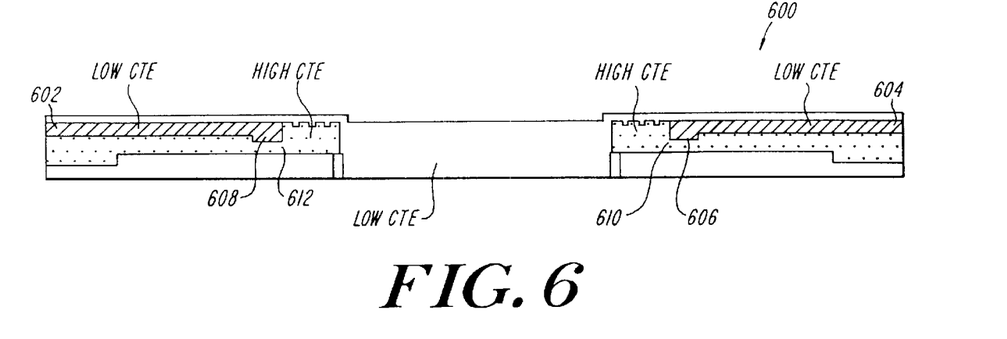
FIG. 6 is a side view of another embodiment of the present invention suitable for use with a Mach-Zehnder Interferometer.

FIG. 6 illustrates one embodiment of the present invention that is suitable for use with an MZI-ADM. This embodiment includes the structure described above with respect to FIGS. 3 and 4 for the fused/tapered ADM but also includes low expansion members 602 and 604. Low expansion members 602 and 604 are constructed of low CTE materials and may include flanges 606 and 608 that are received in slots 610 and 612 respectively. The low expansion members 602 and 604 are attached to the thermal expansion members by epoxy or other suitable bonding agent. The low expansion members 602 and 604 "ride along" with the thermal compensation members 304, 306 and are used to provide a region free of tension upon which the 50% coupling regions of the MZI-ADM may be attached. In this embodiment, the MZI-ADM is attached to the two outer attachment points on opposite sides of each 50% coupling region by using an epoxy or other suitable boding agent to affix the 50% coupling regions to the low expansion members 602 and 604. The low expansion members may be constructed from the same material as the housing or another suitable low CTE material may be used.

Figure 5:
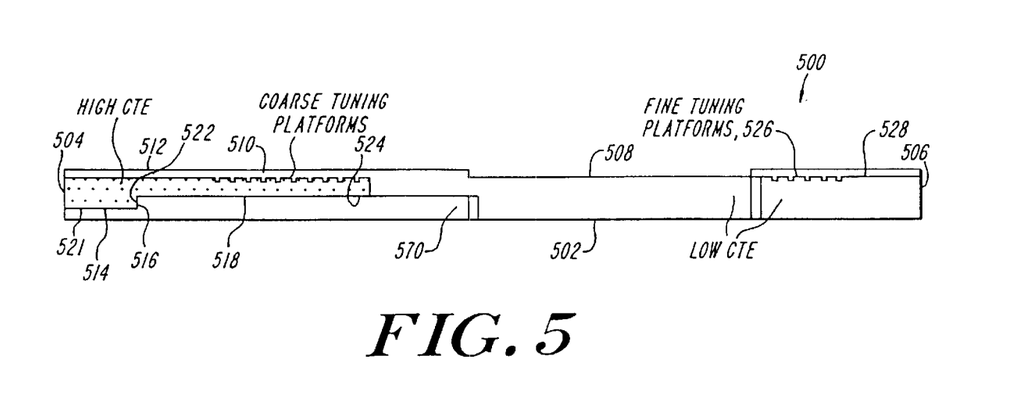
FIG. 5 is a side view of a another embodiment of the present invention.

In another embodiment shown in FIG. 5 a single thermal compensation member is used to thermally compensate an optical device containing an FBG. The housing 502 is identical in its characteristics as used in the other embodiments of the present invention. The housing 502 is constructed of low CTE material, includes a longitudinal channel (not shown) having first and second walls of a first height, and a coupling region 508 in which the first and second walls are a second height. The coupling region 508 includes an aperture or window (not shown) disposed through the bottom surface (not shown) of longitudinal channel. A single thermal compensation member 504 is affixed within the longitudinal channel on one side of the coupling region 508. A single low CTE member 506 is affixed within the longitudinal channel on the opposite side of the coupling region 508 from the thermal compensation member 504.

The thermal compensation member 504 is constructed from a high CTE material and includes a first region 510 and a second region 512. The first region 510 includes a plurality of spaced apart platforms, each of which is substantially the same height as the other platforms. In one preferred embodiment, the thermal compensation member 504 is a step-shaped and includes a bottom surface 514, a step-face surface 516, and a step surface 518. A platform 520 having a step-shape complimentary to the thermal compensation member 504 is disposed within the longitudinal channel. The platform 520 is constructed of low CTE material and in one embodiment may be machined from the housing 502. The platform 520 includes a bottom surface 521, a face surface 522, and an upper surface 524. Bottom surface 514 is juxtaposed with bottom surface 521, step-face surface 516 is juxtaposed with face surface 522, and step surface 518 is juxtaposed with upper surface 524. The thermal compensation member 504 may be affixed within the longitudinal channel by a suitable epoxy or other suitable bonding agent applied between the channel bottom surface 514 and bottom surface 521.

Low CTE member 506 includes a first region 526 and a second region 528. First region 526 includes a plurality of spaced apart platforms that are substantially the same height as the plurality of platforms in region 510 of the thermal compensation member 504. In one embodiment, low CTE member 506 may be affixed within the longitudinal channel on the opposite side of the coupling region 508 from the thermal compensation member 504. Low CTE member 506 may be constructed from the same material as the housing 502 or other suitable low CTE material. In one embodiment, low CTE member 506 is affixed by a suitable epoxy or other suitable bonding agent within the longitudinal channel. In another embodiment, low CTE member 506 may be machined directly from the housing 502.

A fiber optic device (not shown) is disposed across the top surface of the thermal compensation member 504 and low CTE member 506 and a grating region within the fiber optic device is disposed within the coupling region 508. The fiber optic device is first secured by a pair of outer attachments securing the fiber optic device in the second region 512 of the thermal compensation member 504 and second region 528 of low CTE member 506. The FBG is then written in the grating region of the fiber optic device using high intensity UV light and known techniques. Once the FBG is written to the grating region, the package is heated to at least 20° C. above the normal operating temperature. The resonant frequency of the FBG is measured and when the desired resonant frequency is achieved, the fiber optic device is secured with a pair of inner attachments to the appropriate platforms in the first region 510 of thermal compensation member 504 and first region 526 of the low CTE member 506. In this way the resonant frequency of the FBG and the temperature compensation of the package are linked together. In the illustrated embodiment, the plurality of platforms on the thermal compensation member 504 can be considered to be "course tuning" platforms, and the plurality of platforms on the low CTE member 506 can be considered be "fine tuning" platforms. It has been empirically noted that during the heating of the package, the plurality of platforms in region 526 of the low CTE member 506 show a small amount of expansion. If after heating, the resonant frequency of the FBG is not properly compensated, the package can be re-heated and the inner attachments may be repositioned. If a small change in the amount of compensation is required the attachment to the plurality of platforms in region 526 of the low CTE member 506 may be changed. If a larger change in the amount of compensation is required the attachment to the plurality of platforms in region 510 of the thermal compensation member 504 may be changed.

Figure 7:
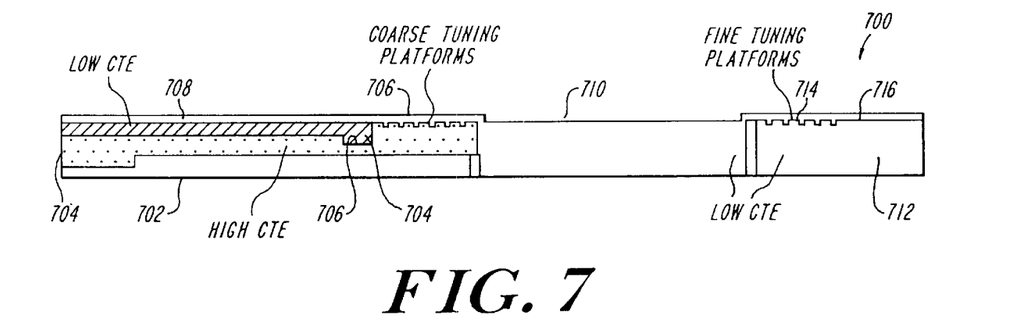
FIG. 7 is a side view of another embodiment of the present invention suitable for use with a Mach-Zehnder Interferometer.

In another embodiment in which only one thermal compensation member is used, a package for passively temperature compensating a MZI-ADM is disclosed. As shown in FIG. 7, to compensate an MZI-ADM the same single thermal compensation structure is used with the addition of low CTE stabilizer member 708. Low CTE stabilizer member 708 is placed over the second region of the thermal compensation member and bonded thereto using epoxy or other suitable bonding agent. In one embodiment, low CTE stabilizer member 708 includes a flange 704 that is received by slot 706 to provide added stability.

A fiber optic device including a MZI-ADM is placed such that one of the two 50% coupler regions is disposed on the low CTE stabilizer member 702 and attached via an epoxy or other suitable bonding agent. The other 50% coupler region is disposed on the second region of the low CTE thermal compensation member and attached thereto using an epoxy or other suitable bonding agent. The grating region that is to receive the FBG is disposed within the coupling region 710 and the FBG is written within the grating region of the fiber optic device. The package is then heated to at least 20° C. above the expected operating temperature. The resonant frequency of the FBG is measured and when the desired resonant frequency is achieved, the fiber optic device is secured with a pair of inner attachments to the appropriate platforms in the first region 706 of thermal compensation member 704 and the first region 714 of the low CTE member 712. In this way the resonant frequency of the FBG and the temperature compensation of the package are linked together. In the illustrated embodiment, the plurality of platforms on the thermal compensation member 704 may be considered to be "course tuning" platforms, and the plurality of platforms on the low CTE member 712 may be considered be "fine tuning" platforms. It has been empirically noted that during the heating of the package, the plurality of platforms in region 714 of the low CTE member 712 show a small amount of expansion. If after heating, the resonant frequency of the FBG is not properly compensated, the package can be re-heated and the inner attachments may be repositioned. If a small change in the amount of compensation is required the attachment to the plurality of platforms in region 714 of the low CTE member 712 may be changed. If a larger change in the amount of compensation is required the attachment to the plurality of platforms in region 706 of the thermal compensation member 704 may be changed.

Figure 8A:
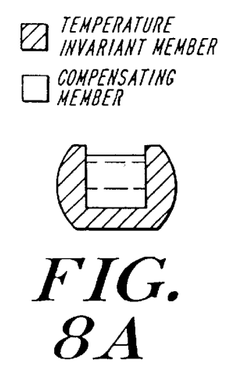
FIGS. 8A, 8B, 8C are cross sectional views illustrating different embodiments of the shape of the present invention.
Figure 8B:
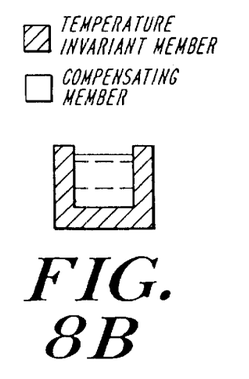
Figure 8C:
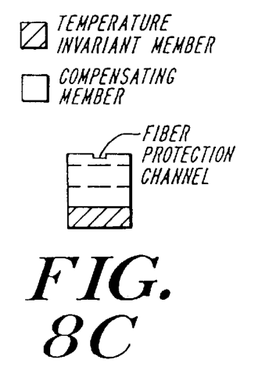

FIGS. 8A, 8B, and 8C illustrate three embodiments for the cross section of the housing member. FIG. 8A illustrates the preferred embodiment of the cross section of the housing member. A housing 800 having circular U-shaped cross section and having a flat bottom portion 802 for preventing rolling by the package is illustrated. FIG. 8B illustrates a housing 810 having a rectangular U-shaped cross section may also be used. FIG. 8C illustrates an embodiment in which the housing 820 is a rectangular cross section. In this embodiment, a fiber protective channel 822 is machined into the top of the compensation members for disposing the fiber optic device within.

Those of ordinary skill in the art should further appreciate that variations to and modifications of the above-described fused/taper fiber optic coupler and the methods of producing it may be made without departing from the inventive concept disclosed herein. Accordingly, the invention should be viewed as limited solely by the scope and spirit of the appended claims.

What is claimed is:

1. An apparatus for temperature compensation of a fiber optic device, the apparatus comprising:

a housing member having a longitudinal channel defined therein by first and second side walls each having a first height and a bottom surface, the housing having a first coefficient of thermal expansion;

a longitudinal coupling region within the longitudinal channel wherein the first and second side walls have a second height and the bottom surface has an aperture defined therethrough, wherein optical communication exists between the coupling region and an external light source via the aperture;

first and second thermal compensation members sized and dimensioned to fit within the longitudinal channel, the first and second thermal compensation members being affixed within the longitudinal channel on opposite sides of the longitudinal coupling region;

the first and second thermal compensation members each having a top surface having a first length and a bottom surface having a second length, the top surface including a first region proximal to the coupling region, and a second region distal to the coupling region, the first region including a plurality of spaced apart platforms, each of the plurality of platforms being substantially the same height, the first and second thermal compensation members having a second coefficient of thermal expansion that is greater than the first coefficient of thermal expansion;

a fiber optic device containing a grating region, the grating region being disposed in the longitudinal coupling region, the grating region being maintained at a predetermined level of tension by the fiber optic device being affixed at opposite ends, each end being affixed to one of the plurality of platforms in the first region of the first and second temperature compensation members respectively;

whereby, as the temperature within the coupling region increases, the first and second temperature compensation members expand toward one another thereby reducing the level of tension within the grating region.

2. The apparatus of claim 1 wherein the first and second thermal compensation members have a step shape.

3. The apparatus of claim 2 further including the bottom surface having first and second platforms on opposing sides of the coupling region and having a first height and a second height, and the end of the first and second platform distal to the coupling region includes a step shape, complementary to the step shape of the first and second temperature compensation members respectively, wherein the first and second temperature compensation members are disposed abutting the first and second platforms respectively.

4. The apparatus of claim 1 wherein the housing member has an elliptical cross section.

5. The apparatus of claim 4 wherein the housing member has a flattened bottom surface, whereby the housing member is prevented from rolling.

6. The apparatus of claim 1 wherein the housing member has a rectangular cross section.

7. The apparatus of claim 1 wherein the housing member is made of quartz.

8. The apparatus of claim 1 wherein the housing member is made of Invar.

9. The apparatus of claim 1 wherein the first and second temperature compensation members are made of high expansion glass.

10. The apparatus of claim 1 wherein the first and second temperature compensation members are made of a steel.

11. The apparatus of claim 1 wherein the steel is a 440 steel.

12. The apparatus of claim 1 further including first and second low expansion members affixed to the first and second thermal compensation members respectively, wherein, the fiber optic device is further affixed on each opposing end to the first and second low expansion members.

13. An apparatus for temperature compensation of a fiber optic device, the apparatus comprising:

a housing member having a longitudinal channel defined therein by first and second side walls each having a first height and a bottom surface, the housing having a first coefficient of thermal expansion;

a longitudinal coupling region within the longitudinal channel wherein the first and second side walls have a second height and the bottom surface has an aperture defined therethrough, wherein optical communication exists between the coupling region and an external light source via the aperture;

first and second thermal compensation members sized and dimensioned to fit within the longitudinal channel, the first and second thermal compensation members being affixed within the longitudinal channel on opposite sides of the longitudinal coupling region;

the first thermal compensation member having a top surface having a first length and a bottom surface having a second length, the top surface including a first region proximal to the coupling region, and a second region distal to the coupling region, the first region including a plurality of spaced apart platforms, each of the plurality of platforms being substantially the same height, the first thermal compensation member having a second coefficient of thermal expansion that is greater than the first coefficient of thermal expansion;

the second thermal compensation member having a top surface and a bottom surface, the top surface including a first region proximal to the coupling region, and a second region distal to the coupling region, the first region including a plurality of spaced apart platforms, each of the plurality of platforms being substantially the same height, the second thermal compensation member having a third coefficient of thermal expansion that is less than the second coefficient of thermal expansion;

a fiber optic device containing a grating region, the grating region being disposed in the longitudinal coupling region, the grating region being maintained at a predetermined level of tension by the fiber optic device being affixed at opposite ends, each end being affixed to one of the plurality of platforms in the first region of the first and second temperature compensation members respectively;

whereby, as the temperature within the coupling region increases, the first temperature compensation members expands toward the second thermal compensation member thereby reducing the level of tension within the grating region.

14. The apparatus of claim 13 wherein the first and second thermal compensation members have a step shape.

15. The apparatus of claim 13 further including the bottom surface having a first platform on one side of the coupling region and having a first height and a second height, and the end of the first platform that is distal to the coupling region includes a step shape, complementary to the step shape of the temperature compensation member, wherein the temperature compensation member are disposed abutting the first platform.

16. The apparatus of claim 13 wherein the housing member has an elliptical cross section.

17. The apparatus of claim 16 wherein the housing member has a flattened bottom surface, whereby the housing member is prevented from rolling.

18. The apparatus of claim 13 wherein the housing member has a rectangular cross section.

19. The apparatus of claim 13 wherein the housing member is made of quartz.

20. The apparatus of claim 13 wherein the housing member is made of Invar.

21. The apparatus of claim 13 wherein the first and second temperature compensation members are made of high expansion glass.

22. The apparatus of claim 13 wherein the first and second temperature compensation members are made of a steel.

23. The apparatus of claim 13 wherein the steel is a 44 steel.

24. The apparatus of claim 13 further including first and second low expansion members affixed to the first and second thermal compensation members respectively, wherein, the fiber optic device is further affixed on each opposing end to the first and second low expansion members.

25. A method for thermally compensating a fiber Bragg grating contained within a fiber optic device, the method comprising the steps of:

providing a fiber optic device having a grating region configured to receive a fiber Bragg grating;

providing a thermal compensating package having a channel in which a portion of the channel is a coupling region, first and second thermal compensation members disposed on opposite sides of the coupling region, each of the first and second thermal compensation members having first and second regions, wherein each of the first regions include a first and second plurality of spaced apart platforms respectively;

disposing within the channel a fiber optic device wherein the grating region is disposed within the coupling region;

attaching the fiber optic device in each of the second regions of the first and second thermal compensation members;

writing a fiber Bragg grating to the grating region of the fiber optic device;

increasing the temperature of the package by at least 20° C. above a normal operating temperature;

attaching the fiber optic device to at least one of the plurality of platforms on each of the first and second thermal compensation members when the fiber Bragg grating is at a predetermined resonant frequency.

* * * * *

UNITED STATES PATENT AND TRADEMARK OFFICE
CERTIFICATE OF CORRECTION

PATENT NO.    : 6,377,727 B1                                      Page 1 of 1
DATED         : April 23, 2002
INVENTOR(S)   : Stavros Dariotis et al.

It is certified that error appears in the above-identified patent and that said Letters Patent is hereby corrected as shown below:

<u>Column 1,</u>
Line 58, "FEG" should read -- FBG --.

Signed and Sealed this

First Day of July, 2003

JAMES E. ROGAN
*Director of the United States Patent and Trademark Office*